(12) United States Patent
Brasseur et al.

(10) Patent No.: US 9,898,169 B2
(45) Date of Patent: Feb. 20, 2018

(54) SCREEN HELP WITH CONTEXTUAL SHORTCUT ON AN APPLIANCE

(75) Inventors: Jerome Brasseur, Pordenone (IT);
Petter Karlsson, Stockholm (SE);
Martin Knausenberger, Rothenburg (DE); Arnd Hofmann, Schallfeld (DE)

(73) Assignee: Electrolux Home Products Corporation N.V., Brussels (BE)

( * ) Notice: Subject to any disclaimer, the term of this patent is extended or adjusted under 35 U.S.C. 154(b) by 662 days.

(21) Appl. No.: 14/347,326

(22) PCT Filed: Oct. 13, 2011

(86) PCT No.: PCT/EP2011/067918
§ 371 (c)(1),
(2), (4) Date: Jun. 5, 2014

(87) PCT Pub. No.: WO2013/053395
PCT Pub. Date: Apr. 18, 2013

(65) Prior Publication Data
US 2014/0317501 A1    Oct. 23, 2014

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 3/016* (2013.01); *G06F 3/0482* (2013.01);
(Continued)

(58) Field of Classification Search
None
See application file for complete search history.

(56) References Cited

U.S. PATENT DOCUMENTS 6,104,334 A * 8/2000 Allport .............. H04N 21/8186
340/12.28
7,136,940 B2 * 11/2006 Roh ........................ F25D 29/00
345/169
(Continued)

FOREIGN PATENT DOCUMENTS

CN       1281595 A     1/2001
CN     102124731 A     7/2011
(Continued)

OTHER PUBLICATIONS

International Search Report for PCT/EP2011/067918, dated Sep. 6, 2012, 3 pages.

*Primary Examiner* — Hua Lu
(74) *Attorney, Agent, or Firm* — Pearne & Gordon LLP (57) ABSTRACT

On-screen help with contextual shortcut on an appliance The invention relates to an appliance (100) with a user interface (110) comprising a display (111) for showing indications about conditions in the appliance, and first (112, 114) and second (113) touch-sensitive input means. The second input means causes the interface to enter an assistance mode displaying which assistance items, which a processing means (121) extracts from a collection (122) of assistance information based on the content of the display when the assistance mode is invoked. In one embodiment, a data record ensures that the user returns to the same page after consulting the assistance mode. In another embodiment, the appliance is adapted to update the collection of assistance information on the basis of data received at an external communication interface. In another embodiment, the display reacts differently to short and long activations of a given touch-sensitive input means. In another embodiment, the display includes parallax compensation.

14 Claims, 4 Drawing Sheets

(51) Int. Cl.
*G06F 9/445* (2018.01)
*G06F 9/44* (2018.01)
*G06F 3/01* (2006.01)
*G06F 3/0482* (2013.01)
*G06F 3/0488* (2013.01)

(52) U.S. Cl.
CPC .............. *G06F 3/0488* (2013.01); *G06F 8/65* (2013.01); *G06F 9/4446* (2013.01)

(56) References Cited

U.S. PATENT DOCUMENTS

| | | | | |
|---|---|---|---|---|
| 7,262,810 | B2* | 8/2007 | Roh | F25D 29/00 348/552 |
| 8,042,346 | B2* | 10/2011 | Oh | F25D 23/12 236/51 |
| 8,424,321 | B2* | 4/2013 | Son | F25D 23/12 62/125 |
| 8,629,753 | B2* | 1/2014 | Yum | F25D 29/00 340/3.1 |
| 8,688,530 | B2* | 4/2014 | Ebrom | D06F 33/02 434/365 |
| 2001/0010516 | A1* | 8/2001 | Roh | F25D 29/00 345/169 |
| 2003/0098888 | A1* | 5/2003 | Guenther | F24C 7/085 715/810 |
| 2003/0143946 | A1* | 7/2003 | Grzeczkowski | H04N 7/17309 455/3.05 |
| 2004/0095370 | A1* | 5/2004 | Broker | D06F 39/005 715/705 |
| 2009/0040324 | A1* | 2/2009 | Nonaka | H04N 5/232 348/220.1 |
| 2009/0326687 | A1* | 12/2009 | McCoy | G06F 8/10 700/90 |
| 2010/0001957 | A1 | 1/2010 | Lee | |
| 2010/0023599 | A1* | 1/2010 | Azuma | H04N 5/4403 709/217 |
| 2010/0050119 | A1* | 2/2010 | Breunig | F24C 7/082 715/812 |
| 2010/0286801 | A1* | 11/2010 | Yum | H04L 12/2809 700/90 |
| 2011/0093158 | A1* | 4/2011 | Theisen | G06F 9/4446 701/29.5 |
| 2013/0067375 | A1* | 3/2013 | Kim | F25D 29/00 715/769 |

FOREIGN PATENT DOCUMENTS

WO  9930425  6/1999
WO  2011/105768 A2  9/2011

* cited by examiner

SCREEN HELP WITH CONTEXTUAL SHORTCUT ON AN APPLIANCE

TECHNICAL FIELD OF THE INVENTION

The invention disclosed herein relates to graphic user interfaces for appliances, preferably cooking appliances. More precisely, the invention relates to methods and devices for providing contextual shortcuts, particularly shortcuts to assistance information.

BACKGROUND OF THE INVENTION

Household appliances are becoming more and more complex, and the development of new functionalities is accompanied by parallel efforts to maintain the man-machine interface user-friendly and simple to handle. The problem of structuring information in graphical user interfaces (GUIs) for household appliances has been addressed in several references. For instance, WO 2005/26620 discloses a domestic cooking appliance with a display means adapted to output different information in different operating states of the appliance, offering situation-related information to the user. Such display means may be configured to hide information that is not related to the current operating state, so as to allow the user to focus on the relevant information. However, even the quantity of information pertaining to a particular operating state may easily overwhelm a user, especially during the initial learning phase or when the appliance is being displayed in a retail store and buying decisions are to be taken. Hence, there is a need for improved GUIs for household appliances.

SUMMARY OF THE INVENTION

In view of the above shortcomings of the prior art, it is an object of the present invention to propose a man-machine interface wherein the information is organized in an improved manner. It is a particular object to hide certain information from the user if this information is currently of lesser relevance.

An appliance may be equipped with control means in the form of a visual display for outputting information (e.g., an indication about conditions in the appliance) and first touch-sensitive input means (e.g., an area of a touch screen, a mechanical knob or button), which are communicatively coupled to a processing means. Together, the display and the input means may be regarded as a GUI. The processing means is operable to invoke a specified control action (e.g., changing an operating condition of the appliance or browsing between menu pages) in response to actuation of the first touch-sensitive input means. The first touch-sensitive input means is preferably a 'soft button' in the sense that its significance may change over time and/or with respect to different operating conditions, so that it can be associated with different control actions in different operating modes. To verify what control action is currently associated with the first touch-sensitive input means, the user may consult the visual display, which when controlled by the processing means may display textual or graphic information indicating this.

The inventors have realized that information can be organized not only into different views (e.g., menu pages) and spatially within a particular view, but also, conceptually speaking, along a further dimension. Accordingly, as set forth in the independent claims, the invention proposes devices and methods enabling an assistance mode, in which one or more assistance items are shown on the visual display. The processing means is configured to store a collection of assistance information (e.g., a database) and to extract those assistance items therein that are relevant to the page currently displayed when the assistance mode is activated. For instance, this may be achieved by storing associations between assistance items and information susceptible of being displayed, so that an assistance page may be dynamically generated (or rendered) on the basis of the information currently displayed at the moment of activation. Since the assistance items to be displayed are extracted contextually (i.e., in response to the content of the display at the moment when the assistance mode was entered), the assistance mode offers the user a shortcut to the relevant assistance information. Preferably, the appliance comprises a second touch-sensitive input means for entering the assistance mode. Like the first touch-sensitive input means, it may be either a touch-sensitive display area or a mechanical button or knob.

Thus, the information (e.g., static information about the appliance, current state information, measurements, available control actions, assistance items) susceptible of being displayed by the visual display is structured both thematically and with respect to its expected frequency of use. Generally speaking, the thematic structure manifests itself by the partition into menu views, which may be associated with each of the available operating states of the appliance, while the frequency of use may translate into a partition into main information and assistance information. Assistance information, which may include instructions for use, troubleshooting information and support details, is typically consulted less frequently than the main information, especially after an initial learning period, and may advantageously be localized in the assistance mode, so that it is hidden from the user except when the assistance mode is active. The invention therefore provides for a menu system with clearly arranged, visually distinct menu pages which is still rich in information thanks to the additional depth afforded by the assistance mode.

Advantageously, the activation of the assistance mode from a menu page changes the menu page into an assistance page containing all assistance items that are relevant in view of the menu page. If several assistance items are shown, the user can easily browse through these in the assistance mode and select the one he or she needs. This is preferred over the option of associating each menu page with several input means that lead to different (sets of) assistance items. One drawback of such a solution is that navigation efficiency requires each such input means to carry an indication regarding the associated assistance item(s), which occupies valuable space that could otherwise have been used to display the main information on the menu page.

The assistance items may comprise textual information (e.g., characters), pictorial information (e.g., pictograms, symbols, icons, still and moving images), aural information (e.g., speech, music, sampled, synthesized or recorded sounds). Within the inventive concept, assistance items may as well include tactile and haptic information (e.g., Braille print, vibrations) and the like.

Preferable ways of generating (or rendering) an assistance page on the basis of a menu view will now be discussed. The features for enabling the generation, which characterize a first group of embodiments, are useful alone and may be practiced independently of the other inventive features.

Since experienced users access assistance information relatively seldom, as already discussed above, it is preferable to limit the second touch-sensitive input means to a single mechanical button or knob, or to a single area of the touch screen. The processing means is adapted to maintain a data record, preferably a non-permanent data record in a volatile memory, relating to the information currently shown in the visual display. The data record may be a full copy of the display content but is preferably limited to the information needed to determine what assistance item(s) is (are) to be displayed. Generally speaking, it is advantageous to represent the display content in terms of its semantic content rather than its graphic form. For example, the display content may be partitioned into functional blocks and described by a list of the functions to which the blocks relate; for the purpose of extracting assistance items, however, the spatial relative positions of these functional blocks are unimportant and are preferably omitted from the data record for simplicity. When the assistance mode is entered from a menu view, the processing means generates and displays an assistance page containing an assistance menu comprising selectable assistance items which have been extracted as a function of the content of the menu view from which the assistance mode was entered. As such, one assistance item may appear in one assistance menu only (that is, this exact assistance menu is only generated from a particular menu view). One or more assistance items in one assistance menu may however appear in assistance menus associated with many other—or even all—menu views in the menu system. An assistance item appearing in all assistance menus, regardless of the menu views from which they were generated, may be regarded as static items. Contact details to a service centre, which may be of use in all operating modes of the appliance, are preferably presented as static assistance menu items.

Preferably, said data record, which indicates the information currently shown in the visual display when the assistance mode was entered, is maintained unchanged throughout the assistance mode. The information in the data record may be used to facilitate navigation, namely by showing information corresponding to the content of the data record on the visual display when the assistance mode is exited. This way, when a user exits the assistance mode after having studied the assistance information, he or she will return to a display image identical or quasi-identical (disregarding clocks and the like) to the one from which he or she invoked the assistance mode. In order that the display image (e.g., menu view), to which the user exits the assistance mode, faithfully reproduces the previous display image, the data record preferably encodes the displayed information in sufficient detail that a visually identical display image can be generated. This may require the data record to be richer in content than in the case where the data record is merely used to control the extraction of assistance items.

If the menu system executed by the GUI is composed of predefined pages, each comprising, possibly, static information combined with areas for browsing, commanding control actions etc. and being interrelated by a browsing structure, then it is advantageous to associate each page with an identifier. The pages may be selected from a page database, which links each identifier to more comprehensive page information sufficient to generate the visual image of the page. The data record may then simply contain the identifier of the currently displayed page, which requires limited storage space. Advantageously, the assistance items that are to be displayed when the assistance mode is entered from a specific menu page can be retrieved from a lookup table associating menu pages with assistance items.

It is currently envisaged to apply the invention to household (domestic) appliances, preferably cooking appliances and most preferably ovens or microwave ovens.

A second group of embodiments of the present invention is intended to mitigate or overcome a problem identified by the inventors. They have realized that the static nature of user's manuals are sometimes an obstacle to subsequent improvement of existing products. Both minor improvements, such as bug fixes in software (upgrades), and the inclusion of new functionalities of potential utility to the user may be rejected for the sole reason that the product has already been released to consumers and it is too late to update the accompanying manuals. This problem arises both when the user's manual is distributed as an electronic document stored on a memory in the appliance and when it is distributed as a paper manual. It is noted that the features encountered in this group of embodiments may be practised independently of the other features of the invention.

To achieve this, the processing means within the appliance further comprises an external communication interface for receiving data (or instructions) relating to maintenance of the collection of assistance information, by way of addition, removal or replacement of assistance items. It is noted that the features characterizing this second group of embodiments may be practised independently of the other inventive features.

The maintenance of the collection of assistance information may be carried out in a dedicated maintenance mode. The external communication interface may be adapted to receive data relating to maintenance of other parts of the GUI as well, whereby a single maintenance episode may update both the collection of assistance information and, for instance, the main information contained in the menus. This setup enables a communicative link to be established from the appliance to an external site such as a customer service centre, user support forum, repair service or the like, even though the external site may be geographically remote. The communication link can be used to distribute software updates, software upgrades and accompanying updates to a menu system executed by the GUI in the appliance. Manually entered messages, automatic error messages identifying a failure condition in the appliance, semi-automatic repair orders, spare part orders and the like may be transmitted over the communication link in the opposite direction, towards the external site. The communication link may be wired or wireless.

Advantageously, the processing means is adapted to generate a new collection of assistance information on the basis of instructions received at the external communication interface and also of a static data record. Suitably, the static record contains a portion of the data that has been identified as relatively less prone to change, e.g., the hierarchic structure of the menu system and graphic decorative material, while the instructions to be received at the external communication interface relate to a portion of the data that is typically more variable. Such more variable portion may relate to the wording of menu texts, association of menu information and assistance items etc. In the maintenance mode, the processing means combines information from both the static record and the instructions received by the external communication interface, formats these into user-readable form if necessary and stores the output data as a collection of assistance information. The collection of assistance information thus generated replaces the previous version of the collection, and this constitutes the update. In the maintenance mode, the processing means may compile computer-readable code, execute formatting commands or interpret presentational mark-up and other codes defined by a mark-up language, such as HTML, XML, CSS and the like. Output data other than assistance items may be stored in other forms than in said collection. An advantage in separating the data underlying the assistance items into a static and an variable portion is that a smaller quantity of data needs to be transmitted to the appliance. This separation is advantageous from a further point of view, namely that it may reduce the vulnerability of the appliance to inadvertent amendments that may be prejudicial to the functioning of the appliance. If all or most data that are critical to the functioning are gathered in the static portion, the risk of a standstill is reduced.

A further possibility falling within the scope of the invention would be to express the amendments to be made to the collection of assistance information in incremental form, that is, in terms of additions and deletions to be made within specific assistance items. Items that are not affected by additions or deletions are left unamended in the maintenance mode. If a non-incremental representation of the amendments is used, then, for completeness, also (data underlying) unamended assistance items are be transmitted to and received by the external communication interface. Using an incremental representation may be a more economic option in that a relatively smaller transmitted data volume is sufficient to enable the maintenance operation and in that the maintenance operation is in most cases concerned with only a subset of the collection of assistance information.

Preferably, the appliance is adapted to enter the maintenance mode in response to a remote control command. For instance, the external communication interface may be adapted to receive and recognize a particular message format that triggers the maintenance mode. This makes it possible to distribute the data necessary for maintenance of the collection of assistance information over an extended period, which may be advantageous if bandwidth is limited, but to carry these maintenance actions out at a well-defined point in time. This is useful to avoid divergences between different instances of the same appliance type with respect to the software installed, and particularly with respect to the assistance information.

In this group of embodiments, where the assistance information in an appliance can be updated after its assemblage and delivery to the consumer, the assistance information may include information produced by the user of the appliance and/or other users of the same appliance type. For instance, the user-generated information may include user-rated assistance items, discussion threads, frequently asked questions, questions and answers, recipes, how-to items, as well as social-media items like images, videos, polls, top lists etc.

In a third group of embodiments, there are provided appliances with visual displays capable of more accurate and reliable interaction with a user. The inventors have realized that display systems that are rich in information may suffer from overcrowding, wherein the visual features are so small that they are difficult to perceive visually and hard to actuate. In the third group of embodiments, this problem is solved by configuring touch-sensitive input means in the display system with multiple meanings depending on the duration of actuation. More precisely, the processor associates a tactile activation of relatively shorter duration with a primary control action and associates a tactile activation or relatively longer duration with a secondary control action. The secondary control action may be to enter an assistance mode of the type described previously. As one example, a touch-sensitive mean may react to a short press by entering "oven cooking settings", while a long press will enter "oven help". Clearly, the appliance may additionally include plural further touch-sensitive input means.

This group of embodiments is particularly useful when the display device is a touch screen, wherein the first touch-sensitive input means may be a sensitive region of the touch screen. As a screen image becomes populated with a greater number of sensitive regions, the size of each decreases, and so the probability that a user inadvertently touches and activates an adjacent region grows. According to this embodiment, however, the number of sensitive regions needed to encode a given number of functions can be limited so that each remains conveniently large.

In a further development, there is provided a guard mechanism for avoiding inadvertent tactile activation of the first touch-sensitive input means, which as noted above may be a region of a touch screen. The guard mechanism may comprise one or more of the following rules:

The processing means responds only to a release of an object (e.g., finger) from the first touch-sensitive input means. In other words, only a complete application-and-release cycle will be perceived as a tactile activation by the processing means. For instance, if the user realizes that his or her finger has touched an unintended region, the option of sliding the finger out of the region may avoid submitting an inadvertent control action to the appliance.

The processing means responds to an application of an object (e.g., finger) to the first touch-sensitive input means by displaying a visual indication identifying the first touch-sensitive input means. In particular, the visual indication may relate to the control action with which the touch-sensitive input means is associated. Hence during the time period between application and release of the object, an indication is shown alerting the user of the control action that will be submitted if the tactile activation is completed. Preferably, the indication is shown in an area of the screen where it is not hidden by the touching object.

Further, the guard mechanism can be specifically adapted to a partition of the control actions as to the seriousness of an inadvertent activation. For instance, the control actions may be divided into operational commands and navigation commands, wherein the former control present and/or future conditions prevailing in the appliance other than in the processing means and visual display, such as a start of a wash cycle or start of a sleep mode. The navigation commands may be used to enter and leave different parts of a menu system executed by the processing means and shown by the visual display, and so will have a limited impact on the physical reality outside the menu system. In particular, an inadvertent entry of a navigation command will not spend energy or time and need not be subject to the same precautionary measures. Based hereon, it is advantageous to configure the guard mechanism with a further rule:

The processing means responds to an invoked operational command by requesting a separate confirmatory activation.

The confirmatory activation may relate to activating a different touch-sensitive input means. This gives the user yet another opportunity to cancel a control action that he or she has initiated inadvertently. Accordingly, the navigation commands are not subject to the separate confirmatory activation, which facilitates navigation around the menu system.

In a further development of the preceding embodiment, the potential cancellation of a control action is facilitated by storage of an indication regarding the content of the screen image from which the invocation of the control action was initiated. The storage may be in the form of a data record relating to the semantic and/or graphical content of the screen image, as discussed above. Hence, if a control action is cancelled for lack of the confirmatory action, the user is brought back to the screen image. This typically leads to more efficient user interaction than if the user had been brought back to a root position in the menu system after the cancelling.

It is noted that the features appearing in the above third group of embodiments can be practised alone and independently of the other inventive features described herein.

The invention relates both to appliances with the features outlined above and to the methods which these perform during operation. The invention further relates to the method of transmitting, from a remote site, update information and executable update instructions to an appliance, causing this to enter maintenance mode and update its collection of assistance information. The method may comprise the final step of confirming that the requested update has been completed successfully.

It is noted that the invention relates to all combinations of features, even if they are recited in different claims.

BRIEF DESCRIPTION OF THE DRAWINGS

The invention will now be described in more detail with reference to the accompanying drawings, on which.

Unless otherwise indicated, like reference numbers are used to indicate like drawing items.

DETAILED DESCRIPTION OF EMBODIMENTS

Figure 1:
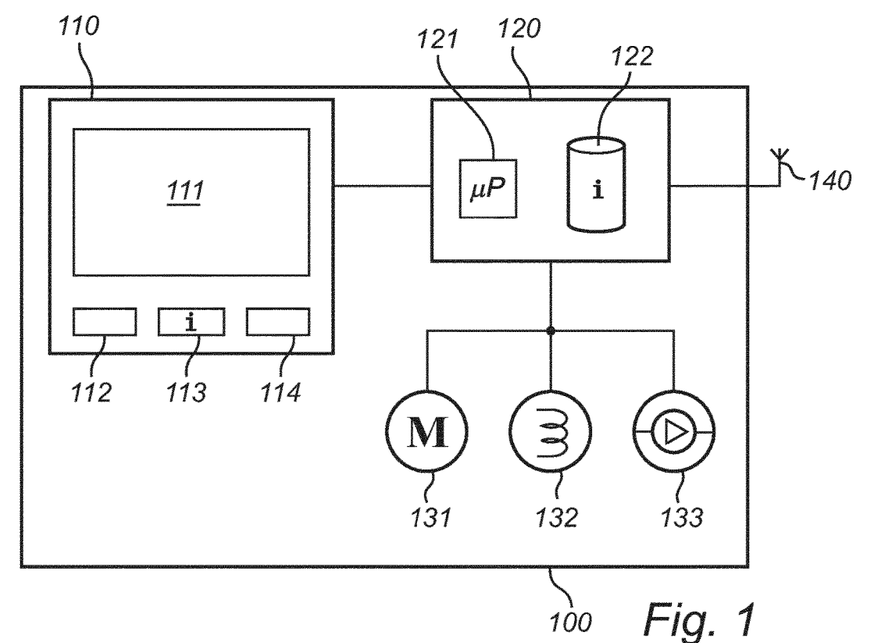
FIGS. 1 and 2 are generalized block diagrams of appliances with graphic user interfaces, in accordance with embodiments of the present invention.

FIG. 1 shows an appliance 100, such as a cooking appliance or in particular an oven or microwave oven, comprising a control section 120, functional components 131, 132, 133 controllable by electric signals from the processing means 120, a user interface 110 enabling a user to communicate with the processing means 120 and an external communication interface 140 enabling the processing means 120 to transmit data to external entities or sites and/or to receive data from such entity or site. The external communication 140 interface may be a wired interface, such as an Ethernet adapter or memory card reader. It may also be wireless, e.g., a Bluetooth, Zigbee or WLAN adapter or an antenna for communication over a wireless telephone network. The processing means 120 comprises at least a microprocessor 121 and a memory 122 for storing, inter alia, assistance information. The memory 122 may for instance be organized as a database, preferably a relational database, from which items can be extracted individually in response to queries in a per se known fashion. The user interface 110 includes a visual display 111 and several touch-sensitive input means 112, 113, 114. The user interface 110 executes a menu system. In the appliance 100 shown in FIG. 1, the first and third input means 112, 114 are soft buttons which are, in each menu view, associated with particular control actions affecting the operating conditions in the appliance (e.g., by sending control information to the functional components 131, 132, 133) or associated with browsing actions relative to the menu system. The control action currently associated with each input means 112, 114 may for example be indicated by text or symbols in the lower portion of the display 111. The second touch-sensitive input means 113 is associated with an assistance mode, in which the display 111 shows assistance information extracted by the microprocessor 121 from the memory 122 in the processing means 120.

Figure 2:
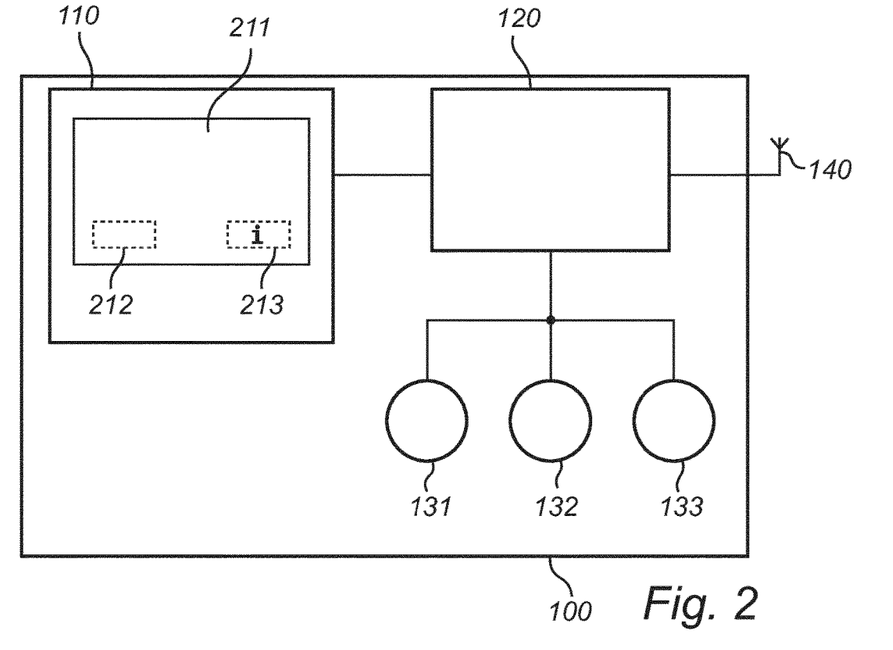

FIG. 2 shows an appliance similar to that of FIG. 1, however equipped with a touch-sensitive display 211 instead of the conventional display 111. First and second touch-sensitive input means 212, 213 are provided in the form of areas in the touch-sensitive screen, which are preferably visually distinctive. The second input means 213 is, similarly to the embodiment shown in FIG. 1, associated with the assistance mode.

Figure 3:
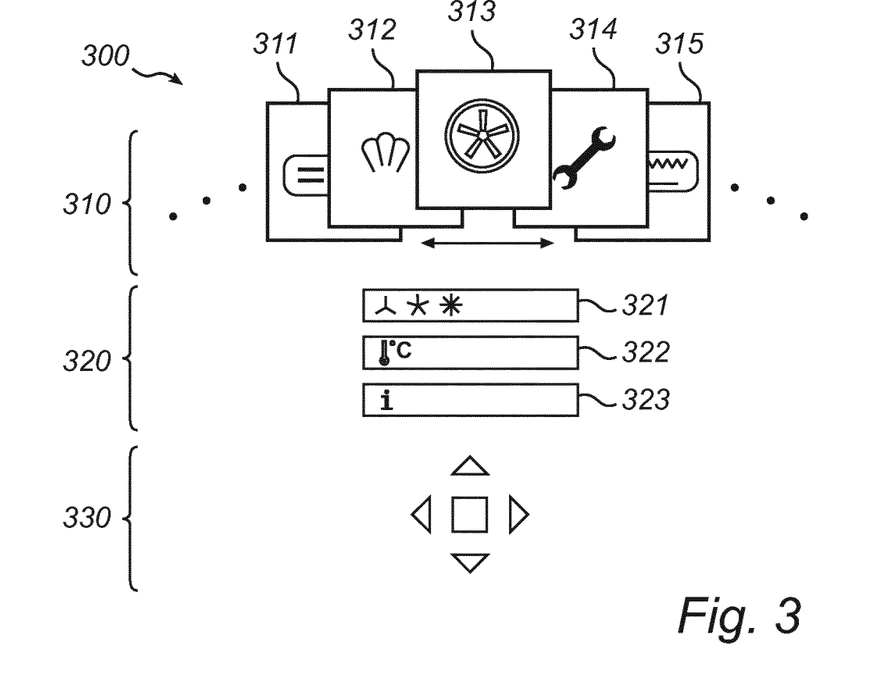
FIGS. 3 and 4 are exemplary views of menu systems suitable to be applied in connection with the present invention.

FIG. 3 is a view 300 of a menu system for an appliance of the type shown in FIGS. 1 and 2. The view 300 is comprised of an macro navigation section 310, a fine navigation section 320 and navigation means 330, which may be provided in the form of touch-sensitive areas in the displayed image or may be buttons separate from the display. Alternatively, if the display is touch-sensitive, the navigation may be commanded by finger gestures, e.g., horizontal swipes for macro navigation, vertical swipes for fine navigation and taps for selection. The macro navigation section 310 is operable to cyclically browse between menu views 311 to 315, which may in a cooking appliance be views relating to conventional baking, steam cooking, fan-assisted cooking, service functionalities and grill cooking. The fine navigation section 320 may change in response to browsing between different menu views. For example, the menu items 321, 322, 323 shown in FIG. 3 relate to the fan-assisted cooking only and will be replaced by other items in other menu views. In particular, several menu views may include an item with an "assistance" symbol similar to that of the third menu item 323; this item 323 is used for entering the assistance mode, but because of the contextual matching of assistance items to menu views, the appearance of the assistance menu opened in response to activating the third menu item 323 may vary between menu views. The third menu item 323, as well as its counterparts in different menu views, therefore realizes a second touch-sensitive input means in the sense of the present invention.

Alternatively, the assistance mode may be activated by a second touch-sensitive input means in the form of a static area of a touch screen or a button located outside the display.

Figure 4:
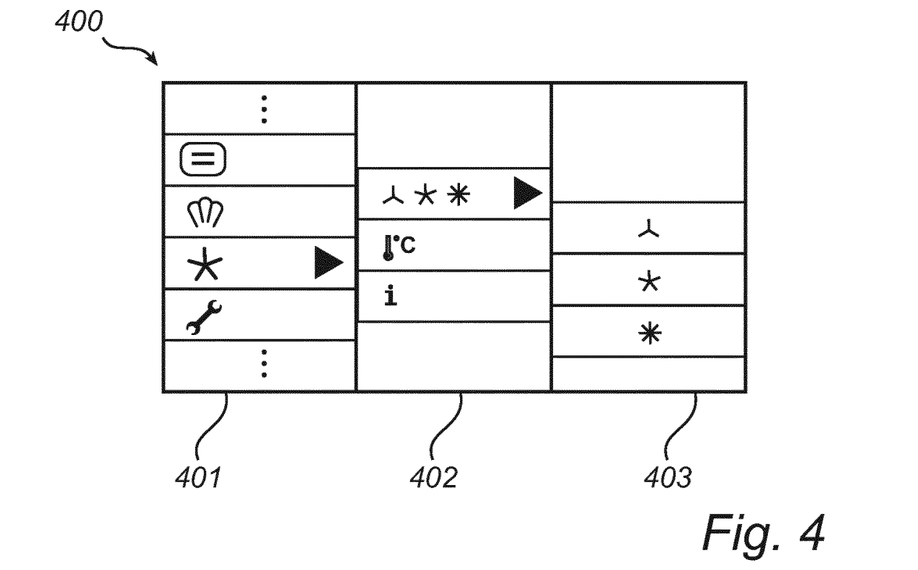

FIG. 4 is another exemplifying view 400 of a menu system, which enables a user to perform macro navigation by selecting an item (e.g., fan-assisted cooking) in a first column 401, whereby items relating to the selection appear in a second column 402 in a hierarchic fashion. Fine navigation is performed by selection of an item (e.g., fan speed) from said second column 402, upon which selection a third column 403 with selectable further menu items appears (e.g., different fan speeds). As suggested by the symbols, the content of the menus may be exactly as in the menu system of FIG. 3, including the item for invoking assistance mode, and it is possible to represent the same structure of hierarchic menus using either one of the menu systems.

Figure 5:
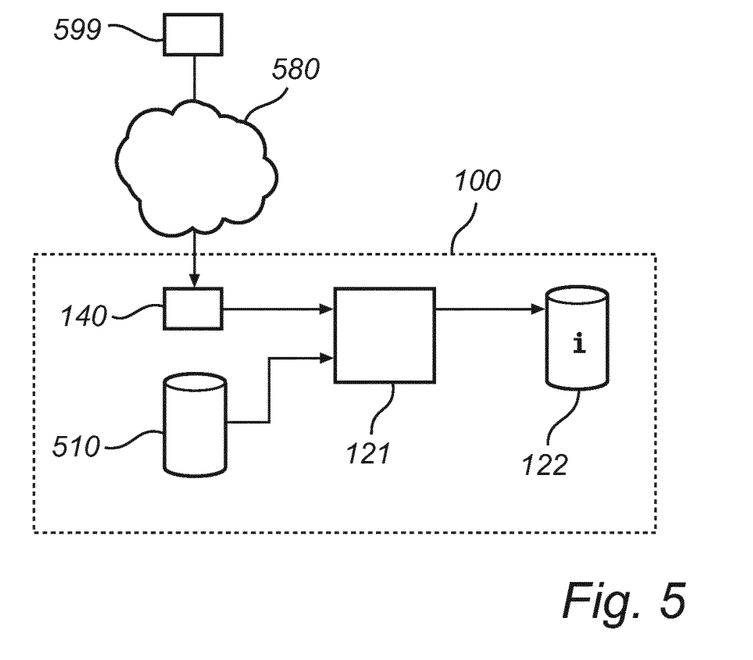
FIG. 5 schematically illustrates a process of dynamically updating a collection of assistance information.

FIG. 5 illustrates information flows during a maintenance process for updating the assistance information in the appliance 100. A remote site 599, at which update information is prepared, and the appliance 100, via its external communication interface 140, are connected to a communication network 580. The external communication interface 140 receives update information, which is in this example a new instance of a variable portion of the assistance information, e.g., all textual information, which is used as a basis for generating a new collection of assistance information 122. The appliance 100 further comprises a memory storing a static data record 510, which may be protected from any amendments or from amendments ordered by unauthorised parties, and is also used as a basis for generating said new collection of assistance information 122. The static record contains information which a system designer has identified as being less prone or suitable to change, e.g., certain pictorial information, style sheets. After new update information has been received at the communication interface 140 (and, possibly, after a message triggering the start of the maintenance process has been received), the microprocessor 121 is configured to generate a new collection of assistance information 122 by concatenating input from the external communication interface 140 and the static data record 510 and carrying out any formatting and similar actions that may be necessary to obtain a collection of assistance information 122 that is ready to use.

Figure 6:
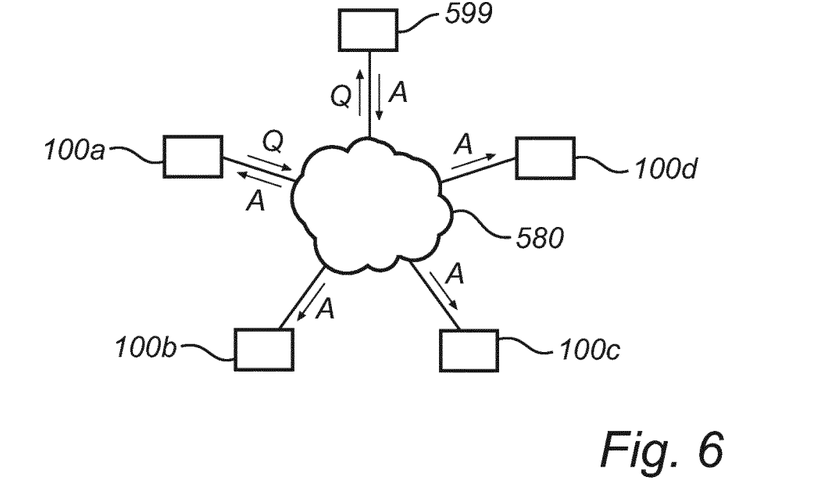
FIG. 6 schematically illustrates a process of generating assistance information through user interaction.

FIG. 6 illustrates a process for generating new assistance information by user interaction. The remote site 599 and a plurality of appliances 100, all of which may be located in different geographic sites, are interconnected via a communication network 580. In an initial step, a first appliance 100a sends a question Q via the network 580 to the remote site 599. A response A (which is preferably self-contained as to its content) is generated in manual or automatic fashion at the remote site 599 and is transmitted to the first appliance 100a and to all further connected appliances 100b, 100c, 100d. The users of the further connected appliances 100b, 100c, 100d may or may not read the response A immediately, but the appliances 100b, 100c, 100d may include the response A in their respective collections of assistance information for later reference.

Many variations to the process shown in FIG. 6 can be envisaged considering that the question Q and response A can be replaced by other information without affecting the technical features of the connected devices. For instance, the question Q may be replaced by a message encoding a rating of an assistance item ("Was this helpful?") by a user of the first appliance 100a, and the response A may be a summary of ratings from different users. This way, if assistance items are amended by adding the rating summary, navigation can be facilitated by favouring highly rated assistance items.

Figure 7:
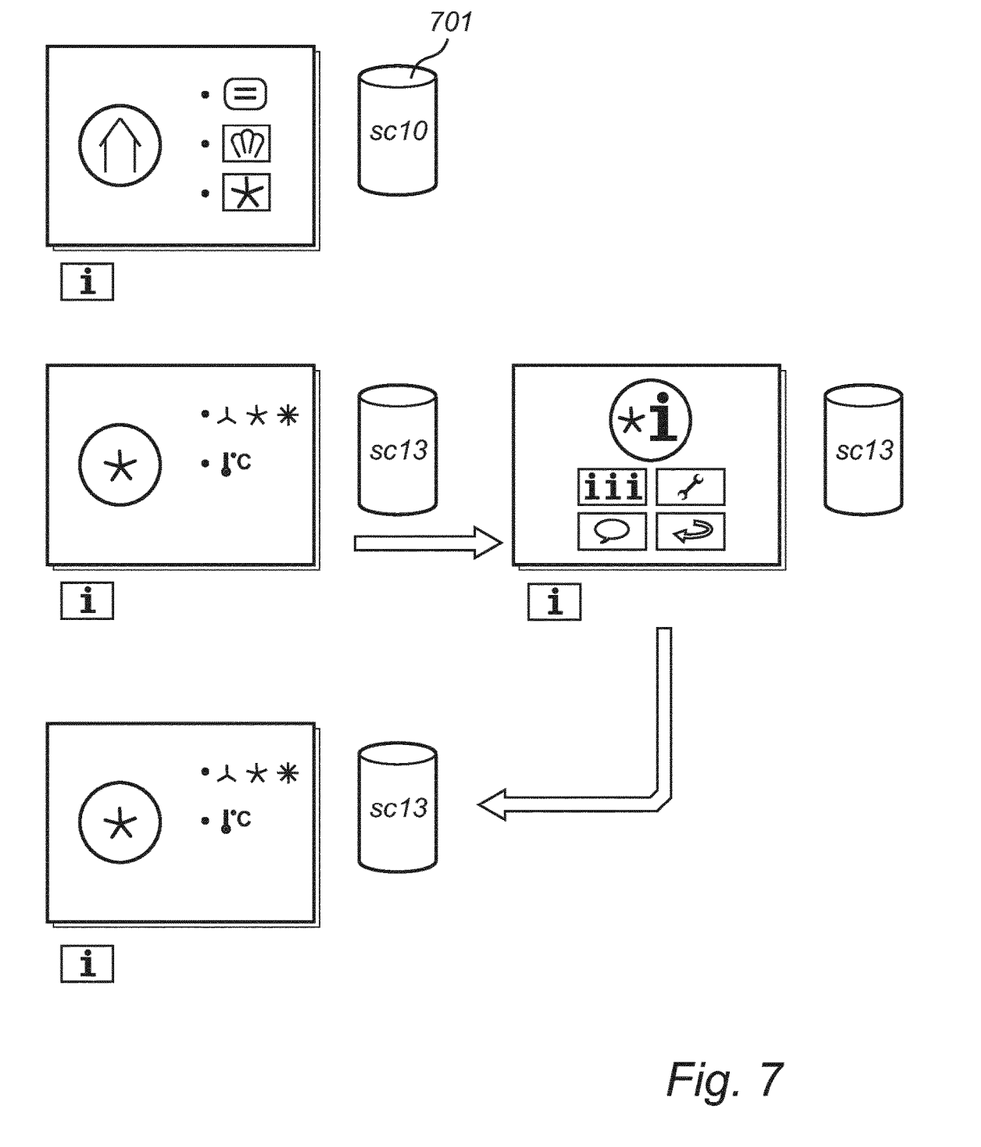
FIG. 7 is an exemplary sequence of menu views produced by a menu system in an appliance according to the present invention.

FIG. 7 illustrates a sequence of menu views which may be produced during use of an appliance according to the invention. Below each menu view there is a touch-sensitive input means labelled with an assistance symbol "i" for activating the assistance mode. The menu system illustrated in FIG. 7 is composed of pages associated with identifiers, such as sc10, sc13. Next to each menu view is symbolically illustrated a data record 701 relating to the information currently shown in the visual display. Since the menu system is organized as pages, it is sufficient to store a page identifier in the data record 701.

The top menu view is a "home" view (identifier: sc10), as indicated by the encircled symbol, in which a user may select one of three menu items, each corresponding to a further menu view corresponding to an operational mode of the appliance. Selecting the lowermost item, which is in this example fan-assisted cooking, opens a menu view relating to the fan-assisted cooking mode (identifier: sc13) with menu items such as fan speed and temperature. By pressing the assistance input means "i", the user will open an assistance menu associated with fan-assisted cooking (identifier: sc13a), as indicated by the rightward arrow. The data record 701 retains the value sc13, which identifies the page from which the assistance mode was invoked. The assistance menu may contain items for obtaining deepened assistance information about fan-assisted cooking, for getting interactive help on this subject, for placing repair orders directed to errors that are typically discovered during fan-assisted cooking and for leaving the assistance mode. The assistance input means "i" may be used both for entering and exiting the assistance mode. When the user leaves the assistance mode, he or she is taken to the page identified by the data record 701, that is, the menu view corresponding to fan-assisted cooking, as indicated by the down/leftward arrow. The user can then continue browsing the menu system from where he or she left it.

In one embodiment (not shown), there is provided an appliance comprising a touch screen for showing indications about conditions prevailing in the appliance and for receiving user input; and a processing means communicatively coupled to the touch screen and configured to variably associate at least one region of the touch screen with one of a plurality of control actions and further to indicate, using the touch screen, the control action with which the region is currently associated. In the appliance, the processing means is operable to associate a tactile activation of relatively shorter duration of a first region of the touch screen with a primary control action and to associate a tactile activation of relatively longer duration of the first region with an assistance mode. An assistance item extracted from a collection of assistance information is then shown on the touch screen, wherein the assistance item to be shown is extracted on the basis of the primary control action associated with the first region of the touch screen.

In a further embodiment, a touch screen in an appliance comprises a visual display surface and a touch-sensitive surface. The two surfaces are substantially parallel to one another and axially separated by some distance, such as at least 2 mm, such as at least 4 mm. The separation may be necessary for reasons of heat insulation or for protecting the visual display surface against sharp objects. The two surfaces may be separated by a transparent plate, a laminated plate or by two parallel transparent plates with an intermediate air gap. By a parallax-related effect, a geometric deviation between regions of the visual and the touch-sensitive surfaces arise when the visual display is viewed from an oblique angle, as is often the case of domestic appliances for which both floor-level mounting and elevated mounting are foreseen. This makes accurate interaction with the touch screen less intuitive. In view of this, the processing means is operable to apply a parallax compensation, by which locations of tactile activations of the touch screen are shifted by a distance in at least one screen direction. The distance and the screen direction are chosen in order that the parallax error is partially or completely compensated.

Since the placement and mounting of the appliance has a considerable impact on the parallax error, the parallax compensation is preferably adapted specifically for a particular installed appliance. The parallax compensation may also be specifically adapted to a particular user, as body height, vision defects and various behavioural parameters may lead to significant differences between persons. The user currently interacting with the appliance may identify him- or herself through a login procedure, or may be biometrically identified en route.

In particular, the processing means may be adapted to compute a mean deviation (or median or suitable quantile), with respect to at least one spatial direction, of locations of past tactile activations of regions of the touch screen and the respective centres of the regions. The processing means then uses said computed mean deviation, or a predefined percentage thereof, as the distance to be used in the parallax compensation. In a further development of this, the processing means is operable in a calibration mode, in which a user is requested to touch predetermined regions to allow computation of a mean deviation.

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. An appliance comprising:
a visual display for showing indications about conditions prevailing in the appliance;
a first touch-sensitive input means; and
a processor communicatively coupled to the visual display and the touch-sensitive input means, said processor being configured:
to associate the first touch-sensitive input means with a control action selectable from a plurality of control actions in respect of the appliance, and
to indicate, using the visual display, the control action with which the first touch-sensitive input means is currently associated,
wherein the processor is configured to store a collection of assistance information containing assistance items,
wherein the collection of assistance information comprises at least one of:
textual information,
pictorial information,
aural information,
wherein the appliance further comprises a second touch-sensitive input means for entering an assistance mode, and the processor is configured to extract one or more assistance items to be shown on the visual display, on the basis of indications present on the visual display at the moment of activation of the second touch-sensitive input means,
wherein the appliance further comprises an external communication interface communicatively coupled to the processor and configured to receive external instructions relating to addition and/or removal of assistance items in the collection of assistance information,
wherein the processor is operable in a maintenance mode, in which the processor implements instructions received at the external communication interface by amending a variable portion of a static data record within the stored collection of assistance information, the static data record comprising both the variable portion and an unchanging portion, and the processor generates a new collection of assistance information on the basis of the static data record and the received instructions, and
wherein in the maintenance mode, the processor implements instructions received at the external communication interface for amending a wording of an assistance item that is already stored in the collection of assistance information or a link between assistance items that are already stored in the collection of assistance information.

2. The appliance of claim 1, wherein the collection of assistance information includes items generated by user interaction comprising at least one of:
a frequently asked question, and
a user-rated assistance item.

3. The appliance of claim 1, wherein the external communication interface is further configured to transmit data relating to a failure condition prevailing in the appliance to a remote site.

4. The appliance of claim 1, wherein:
the second touch-sensitive input means is a single button;
the processor maintains a data record containing data relating to indications currently shown on the visual display;
the processor associates the data record with the one or more assistance items to be extracted from the collection of assistance information; and
the processor shows, in the assistance mode, an initial assistance menu, from which the one or more assistance items extracted by the processor are individually selectable by a user.

5. The appliance of claim 4, wherein the initial assistance menu further comprises at least one static item.

6. The appliance of claim 4, wherein the processor maintains the data record unchanged in the assistance mode and exits the assistance mode by showing indications corresponding to the content of the data record on the visual display.

7. The appliance of claim 4, wherein the processor is adapted to show pages selected from a collection of pages, each carrying an identifier, wherein the data record contains an identifier of a page shown at the moment of activation of the second touch-sensitive input means.

8. The appliance of claim 1, wherein the external communication interface is further configured to receive external instructions relating to removal and/or replacement of assistance items in the collection of assistance information.

9. The appliance of claim 1, wherein the processor implements the instructions received at the external communication interface by amending the stored collection of assistance information by compiling computer-readable code, executing a formatting command, or interpreting mark-up codes.

10. An appliance comprising:
a visual display for showing indications about conditions prevailing in the appliance;
a first touch-sensitive input means; and
a processor communicatively coupled to the visual display and the touch-sensitive input means, said processor being configured:
to associate the first touch-sensitive input means with a control action selectable from a plurality of control actions in respect of the appliance, and
to indicate, using the visual display, the control action with which the first touch-sensitive input means is currently associated,
wherein the processor is configured to store a collection of assistance information containing assistance items,
wherein the collection of assistance information comprises at least one of:
textual information,
pictorial information,
aural information,
wherein the appliance further comprises a second touch-sensitive input means for entering an assistance mode, and the processor is configured to extract one or more assistance items to be shown on the visual display, on the basis of indications present on the visual display at the moment of activation of the second touch-sensitive input means,
wherein the appliance further comprises an external communication interface communicatively coupled to the processor and configured to receive external instructions relating to addition and/or removal of assistance items in the collection of assistance information,
wherein the processor is configured to enter a maintenance mode, in which the processor implements instructions received at the external communication interface by amending a variable portion of a static data record within the stored collection of assistance information, the static data record comprising both the variable portion and an unchanging portion, in response to a message received at the external communication interface, and
wherein in the maintenance mode, the processor implements instructions received at the external communication interface for amending a wording of an assistance item that is already stored in the collection of assistance information or a link between assistance items that are already stored in the collection of assistance information.

11. An appliance comprising:
a visual display for showing indications about conditions prevailing in the appliance;
a first touch-sensitive input means; and
a processor communicatively coupled to the visual display and the touch-sensitive input means, said processor being configured:
to associate the first touch-sensitive input means with a control action selectable from a plurality of control actions in respect of the appliance, and
to indicate, using the visual display, the control action with which the first touch-sensitive input means is currently associated,
wherein the processor is configured to store a collection of assistance information containing assistance items,
wherein the collection of assistance information comprises at least one of:
textual information,
pictorial information,
aural information,
wherein the appliance further comprises a second touch-sensitive input means for entering an assistance mode in which the processor implements instructions received at an external communication interface by amending a variable portion of a static data record within the stored collection of assistance information, the static data record comprising both the variable portion and an unchanging portion, and the processor generates a new collection of assistance information on the basis of the static data record and the received instructions, and the processor is configured to extract one or more assistance items to be shown on the visual display, on the basis of indications present on the visual display at the moment of activation of the second touch-sensitive input means,
wherein the second touch-sensitive input means is a single button,
wherein the processor maintains a data record containing data relating to indications currently shown on the visual display,
wherein the processor associates the data record with the one or more assistance items to be extracted from the collection of assistance information,
wherein the processor shows, in the assistance mode, an initial assistance menu, from which the one or more assistance items extracted by the processor are individually selectable by a user,
wherein the processor is operable to associate a tactile activation of relatively shorter duration of the first touch-sensitive input means with a primary control action, and to associate a tactile activation of relatively longer duration of the first touch-sensitive input means with entry into the assistance mode, wherein the one or more assistance items to be shown are extracted on the basis of the primary control action currently associated with the first touch-sensitive input means, and
wherein in the maintenance mode, the processor implements instructions received at the external communication interface for amending a wording of an assistance item that is already stored in the collection of assistance information or a link between assistance items that are already stored in the collection of assistance information.

12. The appliance of claim 11, wherein the processor is configured to apply a guard mechanism to avoid inadvertent tactile activation of the first touch-sensitive input means, said guard mechanism including that:

the processor responds only to a release of an object from the first touch-sensitive input means as an activation; and the processor responds to an application of an object to the first touch-sensitive input means by displaying a visual indication identifying the first touch-sensitive input means.

13. The appliance of claim 12, wherein:

the control actions include operational commands, for controlling present and/or future conditions prevailing in the appliance other than in the processor and visual display, and navigation commands; and the guard mechanism includes that the processor responds to an invoked operational command by requesting a separate confirmatory activation.

14. The appliance of claim 13, wherein:

the guard mechanism further includes that the processor responds to an invoked operational command by further storing information relating to a screen image, from which the operational command is invoked, and that it responds to a failing confirmatory activation by returning to this screen image.

* * * * *